United States Patent [19]

Holmes et al.

[11] Patent Number: 5,521,743

[45] Date of Patent: May 28, 1996

[54] PHOTON-COUNTING SPATIAL LIGHT MODULATOR WITH APD STRUCTURE

[75] Inventors: Richard B. Holmes, Canoga Park; Glenn T. Bennett, Agoura, both of Calif.

[73] Assignee: Rockwell International Corporation, Seal Beach, Calif.

[21] Appl. No.: 167,292

[22] Filed: Dec. 16, 1993

[51] Int. Cl.$^6$ .................................................. G02F 1/03
[52] U.S. Cl. .................................................. 359/248
[58] Field of Search ........................... 359/248; 357/186

[56] References Cited

U.S. PATENT DOCUMENTS

| | | | |
|---|---|---|---|
| 4,274,103 | 6/1981 | Yamamoto et al. | 357/13 |
| 4,963,727 | 10/1990 | Cova | 250/214 R |
| 5,229,878 | 7/1993 | Tomita et al. | 359/248 |
| 5,350,913 | 9/1994 | Aoshima et al. | 250/205 |

OTHER PUBLICATIONS

Wave Propagation in Photorefractive Media, Jeffrey O. White, Sze-Keung Kwong, Mark Cronin-Golomb, Baruch Fisher, and Amnon Yariv, Photorefractive Crystals, J. Gunter Ed. 1988 pp. 101-109.

Enhanced Luminescence Due to Impact Ionization in Photodiodes, J. H. Swoger and S. J. Kovacic, J. of Appl. Phys. 74(4) 15 Aug. 1993, pp. 2565-2571.

Avalanche Enhancement of Optical Nonlinearities in Semiconductor Junctions, S. M. Horbatuck, D. F. Prelewitz, and T. G. Brown, Appl. Phys. Lett. 56(24), 11 Jun. 1990, pp. 2387-2389.

Feinberg et al., "Phase-Conjugate Mirrors and Resonators with Photorefractive Materials," Photorefractive Crystals, J. Gunter, ed.(Springer Verag, New York, 1988), p. 156.

Hunt et al., "Thermo-optic Response of Avalanche Photodiodes at Photon-counting Light Levels" submitted for publication to Applied Physics Letters for Jul. 1994, pp. 1-23.

Ingerson et al. "Photon-counting with Photodiodes," App. Opt. vol. 22 2013(1983).

Soref et al., "Electro-optical effects in Silicon," IEEE Jnl. of Quant. Electronics vol. Q.E. 23, p. 123 (1987).

Primary Examiner—Georgia Y. Epps
Assistant Examiner—Dawn-Marie Bey
Attorney, Agent, or Firm—George A. Montanye; Harry B. Field; Steven E. Kahm

[57] ABSTRACT

A photon-counting spatial light modulator that has an avalanche photodiode structure and is designed to operate in Geiger mode is sensitive to a single photon of light. An avalanche photodiode having an applied electric field is excited by an optical wave comprising one or more photons whose energies exceed the band-gap energy of the photodiode material. This localized electrical excitation alters the refractive index of the material through various effects, most notably the transient thermo-optic effect and the photorefractive effect. A second optical wave is incident during or shortly after the electrical excitation, and comprises photons whose energy is less than or nearly equal to the band-gap energy. This second optical wave is then used to read out the avalanche-induced variation in refractive index. This read out is most effective when the avalanche photodiode structure has partially reflective front and back surfaces and therefore forms a Fizeau interferometer in which the variation in refractive index causes localized variations in reflectivity.

15 Claims, 2 Drawing Sheets

PHOTON-COUNTING SPATIAL LIGHT MODULATOR WITH APD STRUCTURE

BACKGROUND OF THE INVENTION

1. Field of the Invention

The invention relates to spatial light modulators and more specifically to writing such modulation at very low light levels by use of an avalanche photodiode (APD) structure to promote electrical avalanching and increase the sensitivity of the device.

2. Description of the Related Art

Many types of spatial light modulators are in use at the present time. Such devices may be addressed optically, electrically or mechanically as means to impose modulation on an incident wavefront that reads such modulation. These devices may modulate the phase, the amplitude, or both the phase and amplitude of the reading wavefront. Such devices may either reflect or transmit the modulated wavefront.

Many spatial light modulators utilize silicon and liquid crystal materials wherein various optical effects such as the electro-optic effect, the thermo-optic effect and the photorefractive effect are used for modulation of light. These effects may be enhanced by the application of external electric fields to the material that modulates the reading light pulse. The electric fields, for example, may enhance the response of the material through the action of electron avalanches. In existing spatial light modulators, such electron avalanches are created in a first component and elicit an optical modulation in a second component. Such a first component, if used, comprises a microchannel plate or a photomultiplier tube.

Many spatial light modulators require the fabrication of definite pixels in order to create localized modulation of light. This fabrication process increases the expense of such devices.

The use of electron avalanches have been demonstrated to create an observable optical response in an avalanching material (See S. M. Horbatuck, D. F. Prelewitz and T. G. Brown, "Avalanche Enhancement of Optical Nonlinearities in Semiconductor Junctions" Applied Physics Lett., Vol. 56 (24), pp. 2387–2389 (1990): see also J. H. Swoger and S. J. Kovacic, "Enhanced Luminescence due to Impact Ionization in Photodiodes" J. Appl. Phys. Vol. 74(4), pp 2565–2571 (1993).)

The extension of the above work to low-cost spatial light modulators operating at very low light levels, high resolution, and fast response requires additional electrical and optical techniques. To reduce the cost of spatial light modulators, it is desirable to eliminate need for fabrication of pixels and for a separate electron-avalanching component. This is achievable by use of electron avalanches within the same material that modulates the light. This eliminates the need for a separate avalanching component; it also eliminates the need for pixellation if the avalanching remains localized to the point of excitation. If the external electrical circuit is properly designed, such localization does in fact occur.

Very large avalanches may also be generated to greatly enhance an optical response. This is achieved when certain APD structures are electrically biased above the breakdown voltage. This mode of electrical operation, referred to as the Geiger mode, can generate tens of millions of photoelectrons subsequent to the absorption of a single photon. Operation in this mode is low in noise and uniform in response if a high-quality APD structure is utilized, and if the external circuit has low inductance and intermediate resistance.

Under proper conditions, when the electrical response is strong and localized, the optical response is also strong and localized. If the optical response depends on the thermo-optic effect, then the reading pulse must not be delayed by too much time after the writing avalanche ceases—otherwise the avalanche induced heating will dissipate and diffuse. Similarly, if the optical response depends on the photorefractive effect, then the delay must be short to avoid diffusion of vacated carrier traps.

Another difficulty occurs when using an avalanche material for the optical response: undesirable avalanches may be created by the reading pulse, instead of or in addition to those created by the writing pulse. Such avalanches are avoidable using several techniques. First the wavelength of the reading light may be at a longer wavelength than that of the writing light, so that the energy of the photon of the reading light is less than the band-gap energy of the avalanche material, and is therefore not absorbed. Second, the external bias of the circuit can be actively quenched so that negligible breakdown occurs when the reading light is incident. This latter approach obviously requires a delay between the writing pulse and the reading pulse, a delay which cannot be too long based on the remarks of the preceding paragraph.

SUMMARY OF THE INVENTION

Optically addressed spatial light modulation is performed with an avalanche photodiode operating as a Fizeau interferometer with optical thickness modulated by optically-initiated, avalanche-induced refractivity. Optical response is achieved at photon-counting light levels by use of an avalanche photodiode designed to operate in the Geiger mode with proper selection of external voltage and circuit impedance, and by proper choice of wavelengths of the reading and writing pulses.

OBJECTS OF THE INVENTION

To devise a spatial light modulator that is sensitive to a single photon by utilizing electron avalanching in conjunction with the photorefractive effect.

To devise a spatial light modulator that is sensitive to a single photon by utilizing electron avalanching in conjunction with the transient thermo-optic effect.

To devise a spatial light modulator that is low in cost, owing to its simplicity of structure.

To devise a spatial light modulator that does not require fabrication of pixels, in order to reduce the cost of fabrication and for the device to enjoy variable resolution.

To amplify an optical signal by first writing spatial data at very low light levels and subsequently reading out the data at much higher light levels.

To switch or modulate a relatively intense light beam with an extremely weak light beam.

To create an all-optical imaging sensor which can read out data extremely quickly; each resolution element may be read out in parallel and simultaneously with a single read-out light pulse.

To create an imaging sensor which can record data very quickly owing to the fast response of the various avalanche-induced optical effects.

To provide a method for direct conversion of light of reduced spatial and temporal incoherence light to light of increased coherence.

Other objects, advantages and novel features of the present invention will become apparent from the following detailed description of the invention when considered in conjunction with the accompanying drawing.

DETAILED DESCRIPTION OF THE PREFERRED EMBODIMENT

Avalanche photodiodes are devices which when struck by a photon will conduct electrons. When operated in the normal avalanche mode, the electrons are in an electric field which is strong enough to add energy to the electrons allowing a freed electron to dislodge other electrons. Therefore one photon can create a chain reaction of freeing electrons in the photodiode material.

When operated in the Geiger mode, i.e. when the applied voltage is above the breakdown voltage, the avalanche continues until the current drops to zero or the voltage falls below the breakdown voltage.

Optically addressed spatial light modulators are devices which have a change in refractive index or absorption when light is incident thereon.

The refractive index of a material is affected by several factors. When a portion of the material is heated it expands and thereby changes the refractive index of the material. The refractive index is also changed by the distribution of electrical charge in a material, this effect is significant in some materials, and is termed the photorefractive effect.

When a photon strikes an avalanche photodiode an electron is freed. Further when the electron moves in an electric field it gives off heat and redistributes charge. The heat then changes the refractive index of the material in the immediate area of the electron for a short duration of time, on the order of 20 nanoseconds, until the heat dissipates. The redistribution of charge may also change the refractive index, and persist for up to 500 nsec.

Figure 1:
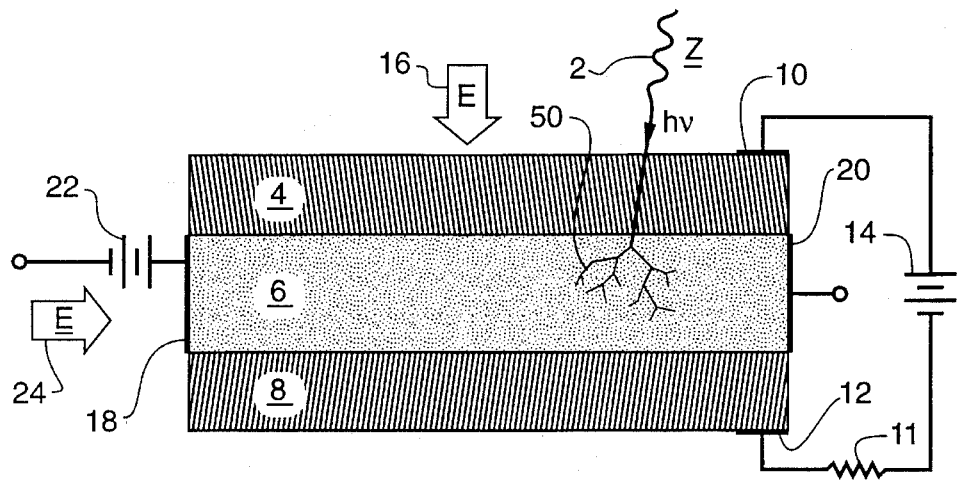
FIG. 1 is a cross section of a photon counting spatial light modulator with an avalanche photodiode.

FIG. 1 shows a cross section of a three layer photon counting photorefractive spatial light modulator with avalanche photodiode structure. A photon 2 is shown striking a positive doped semiconductor layer 4, causing an avalanche 50 of electrons to be released, the second layer is either a negative layer or an insulator 6, and the third layer is a negative layer 8. A charge is placed across the device by electrodes 10 and 12 connected to voltage source 14 and circuit resistance 11. The external circuit should have a low inductance and intermediate resistance. In this manner electric field 16 is created across the device and if the photodetector is properly designed, it can be operated in the Geiger mode.

The device may also have electrodes 18 and 20 connected to voltage source 22. This creates a second electric field 24. The second electric field 24 may be used to enhance the effect, as shown, it is perpendicular to the first electric field 16, but any field direction may be used.

The overall performance of the device is enhanced by hot-carrier assisted absorption, the Franz Keldysh effect and by Gunn domain formation. These effects enhance the photoionization and avalanche gain. A spiked or alternating voltage waveform can also increase the sensitivity of the device. The device can be stacked in parallel or in series for improved primary electron quantum efficiency or multi-wavelength operation.

Avalanche photoelectron gain and ohmic heating are combined to drive the thermo-optic effect, as may be observed in existing silicon avalanche photodiodes. Using the avalanche process, and operating in the Geiger mode, one photon can cause the excitation of hundreds of millions of carrier electrons in a semiconductor. By utilizing the electrical energy supplied by external fields, the optical energy of a single absorbed quantum is multiplied sufficiently to induce a change of the optical properties of the spatial light modulator material. The localized current causes localized ohmic heating; the heating modifies the local carrier density and electronic structure. This results in a refractive index change that is proportional to the average supplied electrical current. Since the refractive index change is so localized no pixellation is required allowing for simplicity of fabrication and low cost manufacturing.

Figure 2:
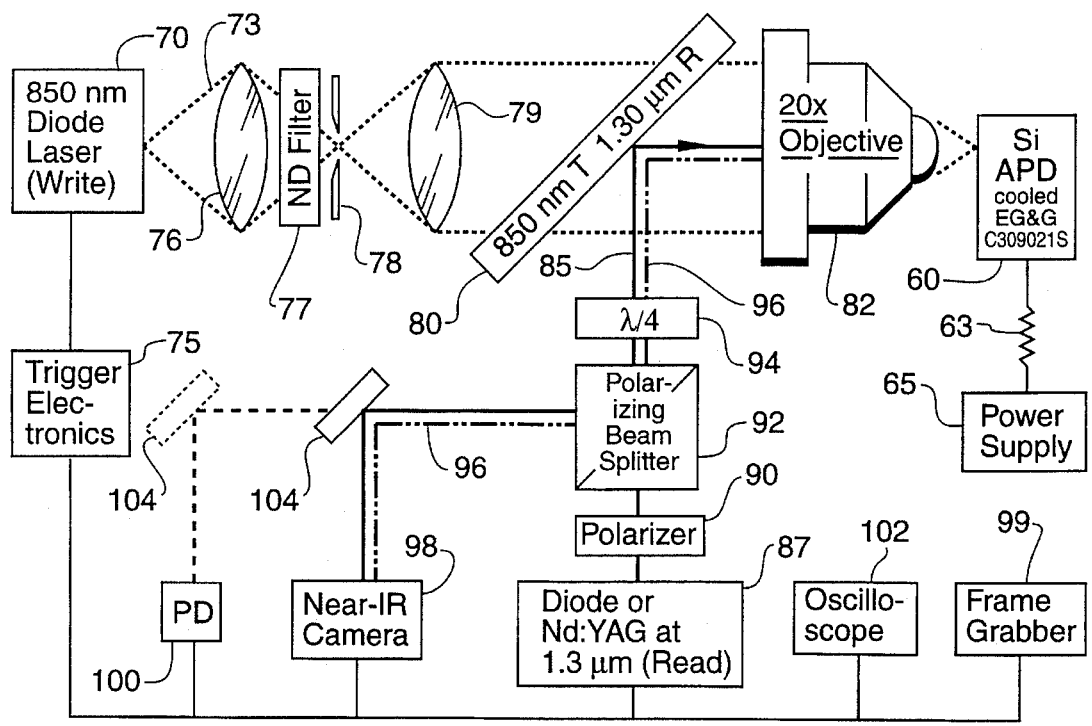
FIG. 2 is a schematic of a spatial light modulator in which the writing and reading pulses are at different optical wavelenghts.

FIG. 2 shows a schematic diagram of a the spatial light modulator in use. The photon-counting photorefractive spatial light modulator with avalanche photodiode structure is composed of a silicon avalanche photodiode 60. Many different types of avalanche photodiodes having various properties may be used; those operating in the Geiger mode give photon-counting sensitivity, here the photodiode was manufactured by RCA, part number C30902S. A power supply 65 provides a variable power to the avalanche photodiode 60.

To write on the avalanche photodiode 60, a 10 nanosecond long write pulse beam 73 from a 850 nm diode laser 70 may be used. The timing for the laser is provided by trigger electronics 75 which drive the laser diode.

The laser beam 73 is spatially filtered by passing through lens ND filter 77, mask or pinhole 78 and lens 79. The laser beam 73 is passed through dichroic beam splitter 80 and then reduced by a 20× microscope objective 82 and is incident on a photodiode 60.

The write laser beam 73 then causes an avalanche of electrons 50 to occur in the avalanche photodiode 60. In this embodiment the avalanche causes the photodiode to heat up in a localized portion of the photodiode in the region of the incident photon or photons from the laser beam 73.

The heated region of the avalanche photodiode material will have an index of refraction which is different from the surrounding, non-heated material. This difference in temperature and index of refraction will depend critically on the duration and strength of the electrical discharge, which lasts for on the order of 100 nanoseconds, after which heat disperses throughout the material and the index of refraction returns to its previous value.

During the time the index of refraction is locally different due to the temperature change the index of refraction may be read by a read laser beam 85.

The read laser beam 85 should be at a wavelength which will pass through the avalanche photodiode 60 without causing avalanching. In the case of a silicon avalanche photodiode the read laser 87 can be a diode or Nd:Yag laser at 1.3 mm.

The read laser 87 is connected to the same triggering electronics 15 as laser diode 70 in order for the timing of the write 73 and read 85 beams to be coordinated.

The read laser bean 85 is passed through a linear polarizer 90, a polarizing beam splitter 92, a quarter-wave plate 94 and is reflected by the dichroic beam splitter 80 through the 20× microscope objective 82 onto the avalanche photodiode 60. The avalanche photodiode 60 has partially reflective front and back surfaces so that the reflected read beam 96 from the avalanche photodiode's surface 60 returns through the 20× microscope objective, is reflected by the dichroic beam splitter 80, passed through the quarter wave plate 94, is rejected by the polarizing beam splitter 92 and directed by path optics 104 to where the beam is imaged on an IR camera 98 and the data is stored in frame grabber 99. Alternatively the path optics 104 guide the beam to photodiode 100 which is connected to oscilloscope 102. The IR camera 98 can image and retain fringes of the reflected read laser 96.

The write pulse duration is on the order of 10 nanoseconds and the read pulse time duration is on the order of 10 nanoseconds with a 10–100 nanosecond pause therebetween. The duration between successive write signals is on the order of 1000 nanoseconds.

Figure 3:
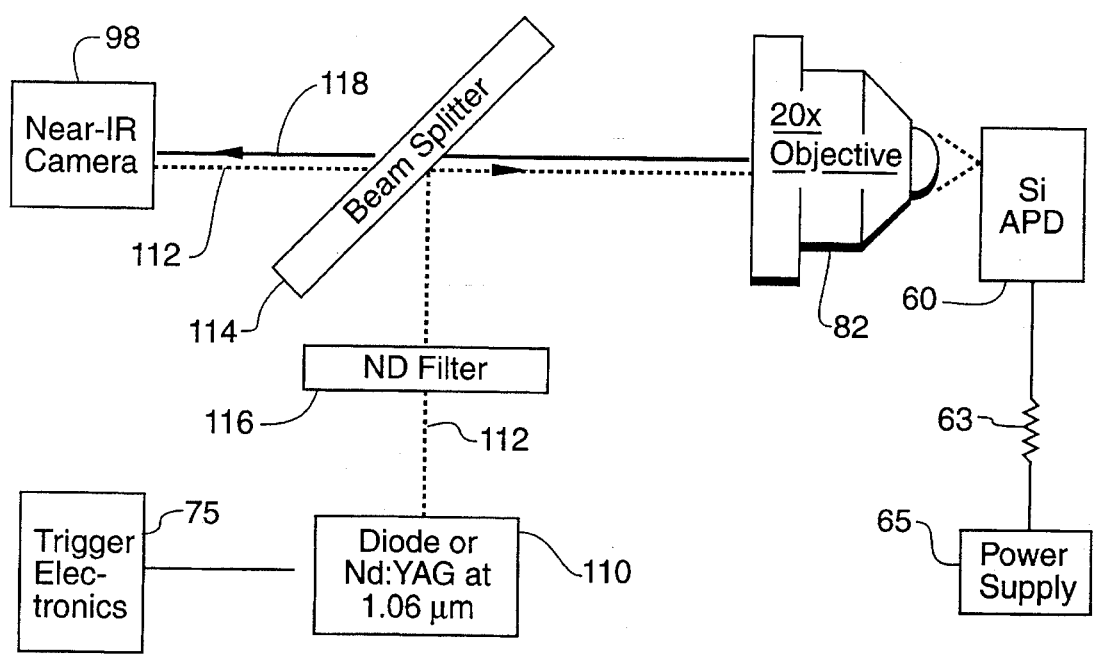
FIG. 3 is a schematic of a spatial light modulator in which both the reading light and writing light are at the same optical wavelength.

In a second embodiment as shown in FIG. 3 a 1064 nm laser beam 112, was used for both the read and write beams. The read and write beams are controlled by trigger electronics 75. The laser beam is produced in laser 110 and directed by the beam splitter 114, to ND filter 116, the 20× microscope objective 82, and onto the avalanche photodiode 60 which has an electric field 16 placed across it by power supply 65 during the write beam's incidence on the avalanche photodiode. The electric field promotes avalanching resulting in heating and photorefractivity of the avalanche photodiode in the localized portion of the avalanche photodiode where the avalanching takes place.

The read beam, 112 in this embodiment, is also produced in laser 110 and follows the same path to the avalanche photodiode 60, however during the time the read beam is incident on the avalanche photodiode the electric field 16 which promotes avalanching and subsequent refractivity is turned off. The read beam therefore does not change the index of refraction of the avalanche photodiode very much but does get refracted by the refractive index of the avalanche photodiode as directed by the write beam. The reflected read beam 118 having been refracted travels through the beam splitter 114 to the camera 98 which records the change in reflectivity caused by the index of refraction on the avalanche photodiode compared to the reflectivity of the unexcited device.

The duration and relative delay of the read and write pulses are similar to those described for dual wavelength operation.

Resistor 63 helps regulate the electric field applied across the photodiode 60. The resistor is in an external circuit which has a low inductance and an intermediate resistance to add a controlled amount of charge to the photodiode quickly.

The front and back of the photodiode 60 may be partially reflective to reflect the read beam so that it can be detected by detection equipment on the same side of the photodiode as the read and write beam sources as shown in FIGS. 2 and 3.

A stack of avalanche photodiodes each one made of a different material sensitive to a different write wavelength may be used. Writing light then passes through successive layers of photodiodes and interacts only with the one that is sensitive to its frequency. In this way a wide band of wavelengths of light may be detected using the technique of the invention while using only one multiple layer photodiode device.

A paper explaining the operation of and experiments conducted on the Photon-Counting Spatial Light Modulator with APD Structure titled Thermo-optic Response of Avalanche Photodiodes at Photon-Counting Light Levels, by J. Hunt and R. Holmes has been submitted for publication in APPLIED PHYSICS LETTERS July 1994. This paper is hereby made a part hereof and incorporated herein by reference. A copy of the paper is attached hereto as appendix A for incorporation herein.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A photon-counting spatial light modular comprising:

a photodiode which is sensitive to a wavelength of light;

a source of photons at a wavelength to which the photodiode is sensitive, incident on the photodiode;

an electric field across the photodiode in excess of the breakdown field to cause avalanching of electrons in the photodiode when the photons from the source strike the photodiode, wherein the avalanching electrons also a photorefractive response which changes the index of the index refraction in the photodiode;

a circuit having a low inductance and an intermediate resistance to regulate the electric field applied across the photodiode, wherein a thermo-optic response causes a change in the index of refraction in the photodiode.

2. A photon-counting spatial light modulator as in claim 1 wherein:

the source of photons provides a write beam of a first wavelength to which the photodiode is sensitive and directing the write beam so that it is incident on the photodiode at a first time;

a second source of photons provides a read beam at a second wavelength to which the photodiode is not sensitive and directing the read beam so that it is incident on the photodiode at a second time, said second beam being refracted and thereby modulated by the photodiode.

3. A photon-counting spatial light modulator as in claim 2:

wherein the photodiode has a back surface which is partially reflective at the read wavelength.

4. A photon-counting spatial light modulator as in claim 2 having:

a means for detecting the amount of refraction in the read beam.

5. A photon-counting spatial light modulator as in claim 4:

wherein the photodiode has a back surface which is partially reflective at the read wavelength.

6. A photon-counting spatial light modulator as in claim 3 having:

a means for detecting the amount of intensity modulation in the read beam.

7. A photon-counting spatial light modulator as in claim 6:

wherein the photodiode has a back surface which is partially reflective at the read wavelength.

8. A photon-counting spatial light modulator as in claim 1 further comprising:

a means for turning on and off the electric field;

a means for pulsing the source of photons at a first time, forming a write beam, when the electric field is on, thus changing the index of refraction in the photodiode;

a means for pulsing the source of photons at a second time, forming a read beam when the electric field is off, the read beam being refracted and thereby modulated by the photodiode.

9. A photon-counting spatial light modulator as in claim 8:

wherein the avalanching electrons also cause a photorefractive response which changes the index of refraction in the photodiode.

10. A photon-counting spatial light modulator as in claim 8 further comprising:

a means for detecting the amount of diffraction to the read beam.

11. A photon-counting spatial light modulator as in claim 8:

wherein the photodiode has a back surface which is partially reflective at the read wavelength.

12. A photon-counting spatial light modulator as in claim 1 wherein:

a stack of photodiodes sensitive to different frequencies is employed to provide a spatial light modulator sensitive to a wider band of incident light frequencies.

13. A photon-counting spatial light modulator as in claim 8 wherein:

a stack of photodiodes sensitive to different frequencies is employed to provide a spatial light modulator sensitive to a wider band of incident light frequencies.

14. A photon-counting spatial light modulator as in claim 1:

wherein a second electric field is applied across the photodiode to enhance the heating of the photodiode caused by avalanching and thereby increase the index of refraction in the photodiode.

15. A photon-counting spatial light modulator as in claim 1:

wherein a second electric field is applied across the photodiode to enhance the photorefractivity of the photodiode caused by avalanching and thereby increase the index of refraction in the photodiode.

* * * * *